Feb. 6, 1962 F. K. LAKE 3,019,645
INK GAUGES
Filed Nov. 9, 1959
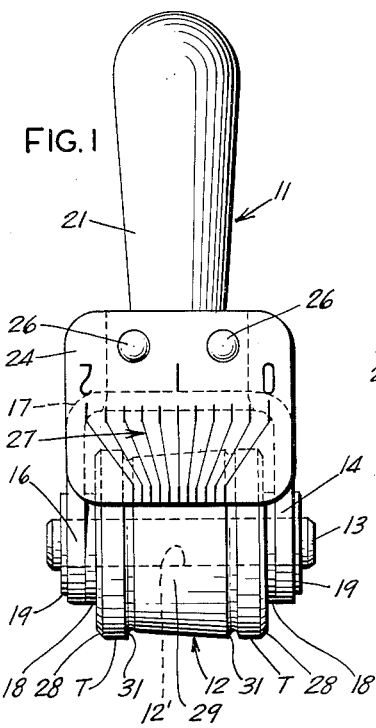
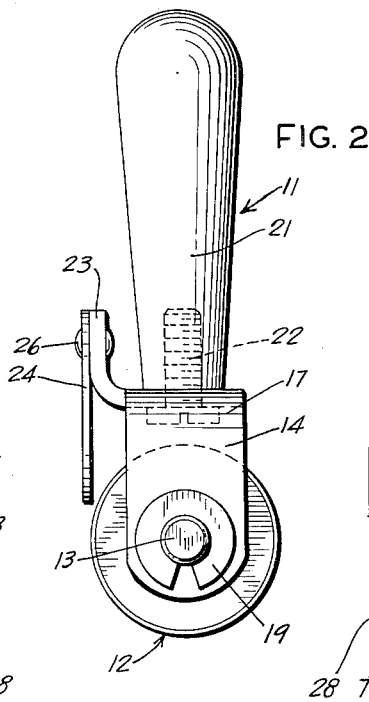
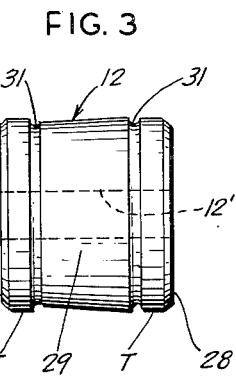
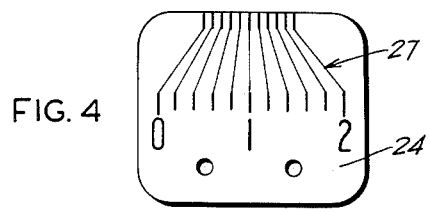
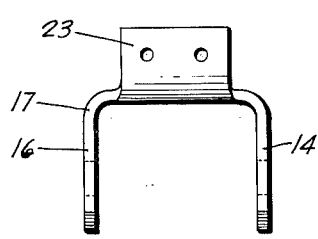
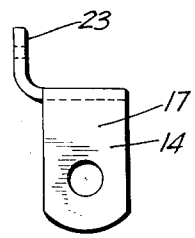
*INVENTOR.*
FRANCIS K. LAKE
BY
*Wallace and Cannon*
ATTORNEYS : # 3,019,645
INK GAUGES
Francis K. Lake, Euclid, Ohio, assignor to Addressograph-Multigraph Corporation, Cleveland, Ohio, a corporation of Delaware
Filed Nov. 9, 1959, Ser. No. 851,659
3 Claims. (Cl. 73—150)

This invention relates to a wet film thickness gauge and particularly to a gauge for determining the thickness of ink films on ink rollers.

Particularly in the instance of multi-color lithographic printing, it is important to be able to accurately control the amount of ink carried by the ink rollers. Thus, proper balancing of tones and color shades in the printed copy is often a matter of adjustment in relative amounts of ink carried by the respective inking rollers, and while it has heretofore been proposed to measure the thickness of an ink film by means of a gauge and thereafter make adjustments to regulate the ink film thickness, the cost of such gauges is excessive, and one of the primary objects of the present invention is to manufacture a relatively inexpensive ink gauge to be used in determining thickness of an ink film on an ink roller. A related object of the present invention is to so construct an ink gauge as to enable the thickness of an ink film to be more easily determined with accuracy than heretofore.

Specifically, the object of the present invention is to construct an ink gauge having a body in the general shape of a roller with a central portion of conical shape disposed between two end disks so that an ink film partially coats the periphery of said portion along the longitudinal axis of the roller to an extent dependent upon the thickness of the film whenever the body is pressed against an inked roller or the surface bearing a liquid film. Thus, the thickness of the liquid film to be measured is visually indicated as a band on the conical-shaped central portion of the ink gauge body, clearly demarked by the unwetted remaining area.

Further objects of the present invention are to construct an ink gauge with a minimum number of parts including a handle, a yoke supporting a tapered roller body, and a graduated scale accurately oriented with respect to the aforesaid conical or tapered central portion of the roller enabling the thickness of an ink film to be readily and accurately determined.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a front elevation view of an embodiment of a wet film thickness gauge constructed in accordance with this invention;

FIG. 2 is an end elevation view of the gauge shown in FIG. 1;

FIG. 3 is an elevation view of a roller body utilized in the gauge shown in FIG. 1;

FIG. 4 is a front elevation view of an indicator scale utilized in the ink gauge shown in FIG. 1;

FIG. 5 is a front elevation view of a yoke utilized in the ink gauge shown in FIG. 1; and FIG. 6 is an end elevation view of the yoke shown in FIG. 5.

A wet film thickness gauge constructed in accordance with this invention is illustrated in FIGS. 1 and 2 of the drawings and is designated by the reference numeral 11. As illustrated in FIGS. 1 and 2, the gauge 11 includes a body 12 which is in the general shape of a roller and which is shown separately in FIG. 3. The roller body 12 is affixed to a shaft 13 which extends longitudinally through a bore 12' in the roller body 12. The ends of the shaft 13 which project outwardly from the roller body 12 are journaled within the opposite depending arms 14 and 16 of a yoke member 17 which constitutes means supporting the roller body 12 for rotation. The axial position of the roller body 12 between the depending arms 14 and 16 is maintained constant by a pair of bushings 18 which are interposed between the arms 14 and 16 and the corresponding ends of the roller body, and by a pair of retainer rings 19 which are seated within suitable grooves in the outer ends of the shaft 13. A handle 21 is affixed to the yoke member 17 as by a cap screw 22 threaded within an end of the handle.

The yoke member 17 includes an upwardly projecting flange 23 which affords a supporting base for a scale or indicator means in the form of a plate 24 which is shown separately in FIG. 4. As best illustrated in FIG. 2, the upper edge portion of the plate 24 is attached to the flange 23 by rivets 26. Thus, the plate 24 extends downwardly so as to have the lower edge thereof in close proximity to the periphery of the roller body 12. As best illustrated in FIG. 4, the plate 24 is provided with an engraved scale 27 on the forward face at the lower edge thereof. The scale 27 is coextensive with a central portion of the roller 12 and is preferably expanded as illustrated to facilitate reading.

With particular reference now to FIG. 3, it is seen that the roller 12 includes a pair of rim or disk portions 28 at the extreme ends thereof and a central or mid-portion 29 of truncated conical configuration. The longitudinal axes of the circular rims 28 and the conical-shaped mid-portion 29 are coaxial so that the tapered conical periphery of the mid-portion 29 is constant for any angular position of the roller body 12 within the yoke member 17. The opposite ends of the mid-portion 29 are preferably spaced from the disk 28 by annular grooves 31. Also, the ends of the roller body 12 are preferably beveled so that the disk 28 is formed with circumferentially extending tread surfaces T of relatively narrow width. The diameter of the treads T afforded on the end disks 28 is at least as great as the diameter of the largest end of the conical-shaped mid-portion 29.

The wet film thickness gauge 11 described hereinabove is especially adapted to be utilized in ink bearing rollers of a lithographic or like printing machine for visually indicating and measuring the thickness of the ink film carried on such rollers. In the operation of the gauge 11, the roller body 12 is aligned with an ink roller having thereon an ink film the thickness of which is to be measured, and the treads T are engaged with the periphery of the inked roller, whereby rotation therebetween causes rotation of the roller body 12 within the yoke member 17. As a result of engagement of the tread surfaces T with the periphery of the printing machine ink roller, a portion of the edge of the conical-shaped mid-portion 29 is immersed within the fluid film carried by the ink roller, and subsequent rotation of the roller body 12 causes a circumferentially extending band of ink to be developed around a portion of the periphery of the conical-shaped mid-portion 29 of the roller body. The width of this band, that is, the extent to which the band extends longitudinally from the larger diameter end of the central portion 29 toward the smaller diameter end thereof, is dependent upon the thickness of the ink film being measured. Thus, by providing a predetermined spacing between the graduations on the scale 27, and because of the above-described coaxial relationship between the longitudinal axes of the disk end 28 and the mid-portion 29 of the roller body 12, the exact thickness of the film being measured can be determined in direct reading units.

As an example, in an actual embodiment, the diameter of the conical mid-portion 29 is 0.004 of an inch larger at one end than it is at the other end. Thus, the central portion 29 tapers 0.002 of an inch from the large diameter end to the small diameter end, and the scale 27 is divided into twenty uniform spaces by the graduations thereon, so that each space between two graduations is equal to 0.0001 of an inch. Each graduation on the scale therefore represents 0.0001 of an inch of film thickness.

It is quite important that the material utilized for the roller body 12 be of a material which can be accurately shaped and which is resistant to deformation as well as to becoming defaced or marred during use. It has been found advantageous to utilize a high carbon steel for the roller body 12 and to form the conical periphery thereof by a grinding operation. In this regard the grooves 31 not only afford a convenient line of demarcation for the end portions of the conical periphery but also serve as reliefs to facilitate the grinding operation.

While the wet film thickness gauge 11 has been particularly described as being usable to measure and indicate the thickness of ink films carried on the ink rollers of lithographic printing machines, it will be recognized that a gauge constructed in accordance with this invention can equally well be utilized to measure the film thicknesses of other liquids carried by other surfaces.

Thus, in accordance with this invention there is afforded a gauge for measuring film thicknesses which is relatively inexpensive to manufacture, inasmuch as the component parts of the gauge are few in number and can be fabricated by relatively simple manufacturing operations, yet which enables a film thickness to be accurately measured and conveniently indicated. The parts are subject to little wear and are so arranged relative to one another that there is little chance that the parts will become misaligned during use.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A gauge for measuring the thickness of liquid film on a liquid bearing member and comprising; a body in the general shape of a roller engageable in rolling relation with the liquid bearing member, said body including end disks of substantially the same diameter for engaging the periphery of a member bearing a fluid film to be measured, a central portion of conical shape supported between said end disks and adapted to be partially coated along the longitudinal axis thereof by a fluid film to be measured, and said body being formed with annular grooves spacing the periphery of the conical central portion from the periphery of the end disks; means including a handle mounting said body for rotation therein; and an indicator including a graduated scale mounted on said means in alignment with the axis of said body central portion for indicating the thickness of the film being measured as related to the axial extent to which the conical portion is wetted by a liquid film.

2. A wet film thickness gauge for use in measuring the thickness of a film on a fluid bearing surface and comprising, a body including rim portions of equal diameter at the ends thereof and a mid portion between the rim portions formed with a conical periphery spaced from said rim portions but axially aligned therewith so as to have a part of said conical periphery coated by the fluid film whenever said body is rolled along a fluid bearing surface, an indicator on said gauge for indicating film thicknesses as represented by the axial extent to which a film band wets said conical periphery, and means including a yoke and handle supporting said body for rotation when rolled along a fluid bearing surface.

3. A gauge for measuring the thickness of a liquid film on a liquid bearing member and comprising, a body in the general shape of a roller and including a solid central portion of truncated conical shape having a substantially uniform taper, circular disks at the ends of said central portion and coaxial therewith, said disks being of substantially the same diameter to be simultaneously engageable with the surface of the liquid bearing member, the diameter of said disks being at least equal to the maximum diameter of said central portion, a handle, means on said handle supporting said roller for rotation about the axis of said central portion, and an indicator gauge associated with the handle and inscribed to indicate film thicknesses as related to the axial extent to which the conical portion is wetted by a liquid film.

References Cited in the file of this patent

UNITED STATES PATENTS

| 2,839,835 | Zollinger | June 24, 1958 |

FOREIGN PATENTS

| 685,238 | Great Britain | Dec. 31, 1952 |